United States Patent
Vargantwar et al.

(10) Patent No.: US 8,155,074 B1
(45) Date of Patent: Apr. 10, 2012

(54) METHODS AND SYSTEMS FOR IMPROVING PERFORMANCE OF APPLICATIONS USING A RADIO ACCESS NETWORK

(75) Inventors: Sachin R. Vargantwar, Overland Park, KS (US); Manoj Shetty, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 396 days.

(21) Appl. No.: 12/505,453

(22) Filed: Jul. 17, 2009

(51) Int. Cl.
*H04W 72/10* (2009.01)
*H04J 3/16* (2006.01)

(52) U.S. Cl. ...... 370/330; 370/336; 370/328; 455/452.1

(58) Field of Classification Search .......... 370/232, 370/252, 328, 329, 330, 336, 342–343, 338, 370/412–413; 455/450, 452.1
See application file for complete search history.

(56) References Cited

U.S. PATENT DOCUMENTS

| | | | |
|---|---|---|---|
| 2003/0152095 A1* | 8/2003 | Foore et al. | 370/412 |
| 2007/0058659 A1 | 3/2007 | Ayyagari et al. | |
| 2007/0070908 A1* | 3/2007 | Ghosh et al. | 370/236 |
| 2007/0297360 A1* | 12/2007 | Joachim et al. | 370/329 |
| 2008/0233886 A1* | 9/2008 | Kaminski et al. | 455/70 |
| 2009/0125650 A1* | 5/2009 | Sebire | 710/57 |
| 2009/0225709 A1* | 9/2009 | Wager et al. | 370/329 |
| 2010/0070814 A1* | 3/2010 | Damnjanovic et al. | 714/748 |
| 2010/0157895 A1* | 6/2010 | Pani et al. | 370/328 |
| 2010/0302946 A1* | 12/2010 | Yang et al. | 370/235 |

OTHER PUBLICATIONS

Zhang and Jordan, "Cross Layer Dynamic Resource Allocation with Targeted Throughput for WCDMA Data," Mar. 21, 2007.

* cited by examiner

*Primary Examiner* — Kwang B Yao
*Assistant Examiner* — Candal Elpenord

(57) ABSTRACT

Methods and systems for improving the performance of a radio access network (RAN) are presented. In particular, for a given WCD, a RAN may detect a pattern of forward link buffer occupancy and reverse link buffer occupancy that is indicative of the given WCD's reverse link data rate suffering from the effects of the WCD's forward link being congested. Accordingly, the RAN may allocate additional forward link capacity to the given WCD, so that the given WCD may be able to receive more data on the forward link. As a result, the WCD may also be able to transmit at a higher reverse link data rate.

13 Claims, 8 Drawing Sheets

METHODS AND SYSTEMS FOR IMPROVING PERFORMANCE OF APPLICATIONS USING A RADIO ACCESS NETWORK

BACKGROUND

Many networked applications require bidirectional communication. Using one or more of these applications, a device may transmit data in one direction while receiving data in the other direction. For example, a wireless communication device (WCD) with data capabilities may transmit a request for data to a networked server. This request flows in what is called the "reverse direction," and may reach the web server via a radio access network (RAN). The WCD may receive the requested data from the networked server also via the RAN. The requested data flows in what is called the "forward direction."

In many such transactions, the amount of data that the RAN transmits in the forward direction is far greater than the amount of data that the WCD transmits in the reverse direction. For example, a typical request for a web page is a relatively short message, consisting of as little as a few tens of bytes of data. However, the requested web page may consist of a megabyte of data or more. Some wireless communication technologies have been implicitly or explicitly designed to support applications that require more forward direction capacity than reverse direction capacity. For example, code division multiple access technologies tend to support higher maximum data rates from a RAN to a WCD than from the WCD to the RAN.

However, not all applications exhibit this typical behavior. Some applications may make heavier use of the reverse direction than the forward direction. Examples of this type of application include, but are not limited to, file transfer applications and file sharing applications.

OVERVIEW

Methods and devices for improving the performance of applications using a RAN are presented. In particular, these methods and devices may mitigate situations where a WCD's forward direction capacity limits the WCD's ability to transmit in the reverse direction. One such situation may occur when the WCD is transmitting data in the reverse direction and receiving acknowledgements for this data in the forward direction. If the acknowledgements are delayed in the RAN due to congestion on the forward direction link, then the WCD's reverse direction data rate may decrease, even if the WCD's reverse direction link capacity has not decreased. Another such situation may occur when the WCD is receiving data in the forward direction, and simultaneously transmitting a representation of at least some of this data in the reverse direction. If the data flowing in the forward direction is delayed in the RAN due to congestion on the forward direction link, then the WCD's reverse direction data rate may also decrease despite there being sufficient reverse direction link capacity for the WCD to transmit at a higher rate.

These and other such situations may be mitigated by the RAN determining that the WCD's reverse link data rate may be gated by the WCD's forward link data rate, and taking remedial steps to improve the flow of data on the forward direction link to the WCD. Thus, in a first embodiment, a RAN may contain a forward link buffer that queues packets to a WCD, and a reverse link buffer that queues packets from the WCD. The forward link buffer may also be associated with a first high threshold and a first low threshold, and the reverse link buffer may also be associated with a second high threshold and a second low threshold.

The RAN may detect a recurrence of a pattern of buffer occupancy, where the pattern includes a first state in which the forward link buffer is above the first high threshold and the reverse link buffer is below the second low threshold, followed by a second state in which the forward link buffer is below the first low threshold and the reverse link buffer is above the second high threshold. Preferably, this pattern occurs within a given duration of time.

This pattern is indicative of a WCD that has data to transmit on the reverse link, but is gated or at least limited, by the capacity allocated to the WCD on the forward link. For instance, when the RAN is in the first state, the first forward link buffer may be queueing data and/or acknowledgments headed to the WCD. Thus, the WCD may be unable to transmit on the reverse link, until it receives these data and/or acknowledgments. Consequently, the WCD may queue a number of packets while waiting for the data and/or acknowledgments. Once the WCD receives the data and/or acknowledgements, it may transmit the queued packets, resulting in the RAN being in the second state.

One overall impact of such a pattern is that the RAN may transmit data to a WCD and receive data from a WCD in bursts. If this pattern occurs for multiple WCDs, the bursts may synchronize to the point where the RAN's buffer capacity is overloaded, thus resulting in packet delay and/or packet loss at the RAN or at other devices connected to the RAN. It is desirable for the RAN to attempt to reduce this burstiness, and instead maintain a smooth flow of data in both the forward direction and the reverse direction for each WCD. Doing so may decrease the likelihood of packet delay and/or packet loss at the RAN or other devices.

Therefore, based on at least the detection of the recurrence, the RAN may allocate additional capacity on the forward link to the WCD. In this way, data may flow more smoothly in the forward direction to the WCD, thus allowing the WCD to transmit data more smoothly in the reverse direction.

In a second embodiment, the wireless coverage area may serve a first WCD and a second WCD. The RAN may contain a forward link buffer associated with the first WCD, and also a reverse link buffer associated with the first WCD. The RAN may detect a pattern of buffer occupancy entailing (i) the forward link buffer containing a first burst of data, (ii) the forward link buffer being empty due to the RAN transmitting the first burst of data to the WCD, and (iii) the reverse link buffer containing a second burst of data. Preferably, this pattern of buffer occupancy occurs within a given period of time. In this way, the RAN may detect that the WCD could be queueing reverse direction data while the WCD is waiting for the arrival of forward direction data.

Based on at least the detection of the pattern, the RAN may grant the first WCD a first forward link priority, and grant the second WCD a second forward link priority. Preferably, the first forward link priority is higher than the second forward link priority. Then, the RAN may determine that the forward link buffer contains a third burst of data, and transmit the third burst of data to the first WCD according to the first forward link priority. In doing so, the RAN may allocate more forward link capacity to the first WCD than the second WCD, so that the first WCD can transmit more effectively in the reverse direction. A result of the RAN operating in accordance with this embodiment may be less burstiness in the flows of data to and from the first WCD.

These and other aspects and advantages will become apparent to those of ordinary skill in the art by reading the following detailed description, with reference where appropriate to the accompanying drawings. Further, it should be understood that the foregoing overview is merely exemplary and is not intended to limit the scope of the invention as claimed.

DESCRIPTION

In accordance with exemplary embodiments, methods and devices for improving performance of applications using a RAN are presented. In particular, the RAN may detect patterns of buffer occupancy in the RAN that are indicative of bursty transmissions to and from a WCD. Such burstiness could be a source of packet loss in the RAN or other devices. In order to mitigate any such packet loss, the RAN may take steps in attempt to smooth out these bursty transmissions.

I. System Architecture

Figure 1:
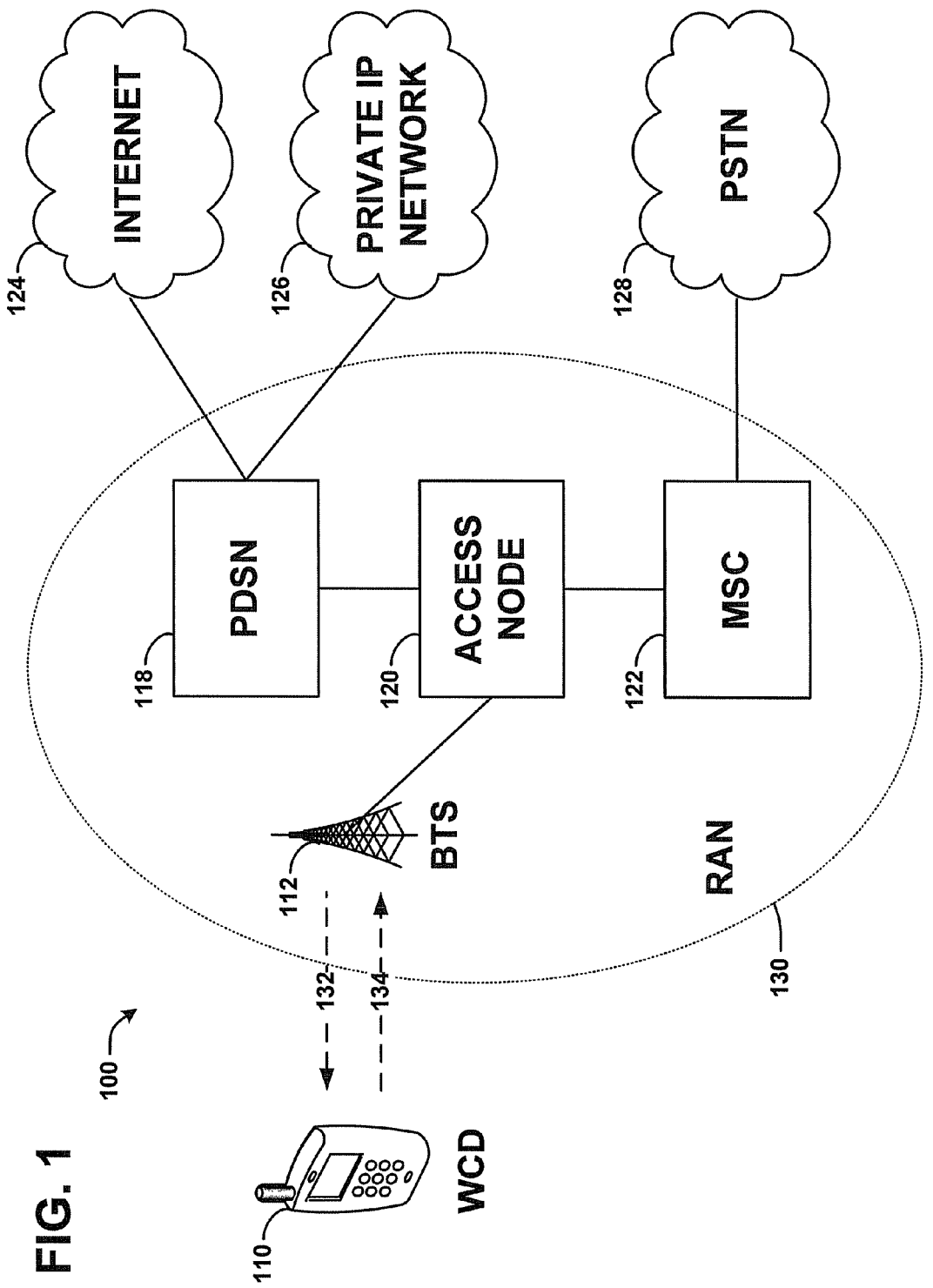
FIG. 1 depicts a wireless communication system, in accordance with an exemplary embodiment.

FIG. 1 is a simplified block diagram of example communication network 100, in which example embodiments may be employed. Network 100 may include a base transceiver station (BTS) 112 that can communicate with a WCD 110 via one or more wireless coverage areas. WCD 110 could be a wireless telephone, wireless personal digital assistant, wirelessly equipped laptop computer, wireless router, or another type of mobile or fixed wireless device.

BTS 112 may radiate to define the wireless coverage areas. Each wireless coverage area may provide air interface access to WCD 110 and any other WCDs served by the wireless coverage area. The air interface may include a forward link 132, supporting communication from BTS 112 to one or more WCDs, and/or a reverse link 134, supporting communication from one or more WCDs to BTS 112. WCDs may exchange signaling, voice, data, video, or other media with BTS 112 through the forward and reverse links.

In this regard, the WCDs may use the wireless coverage areas defined by BTS 112 to communicate with one or more endpoints. These endpoints may include other WCDs, e-mail servers, World Wide Web servers, gaming servers, media servers, media gateways, and/or location-based services. The communication may occur via a packet-switched network (e.g., the Internet 124 or private IP network 126), and/or a circuit-switched network, such as the public switched telephone network (PSTN) 128.

In some arrangements, forward link 132 may have a greater maximum data rate than reverse link 134. For instance, in CDMA Evolution Data-Optimized Revision A (EVDO Rev. A), a forward link may have a maximum forward link data rate of 3.1 megabits per second, and a maximum reverse link data rate of 1.8 megabits per second. However, an EVDO Rev. A forward link may be shared by multiple WCDs. For example, a forward link may operate in accordance with time-division multiplexing (TDM). Thus, the forward link may be divided into TDM slots, and the RAN may transmit data to at least one WCD during each forward link TDM slot.

Alternatively, forward link 132 and reverse link 134 may exhibit symmetrical maximum data rates, or reverse link 134 may have a greater maximum data rate than forward link 132. Furthermore, regardless of any maximum data rates associated with these links, the realizable data rate on each link may fluctuate due to interference, attenuation, distortion, and/or WCDs changing positions. Thus, each individual WCD may, from time to time, have more capacity available on its reverse link than on its forward link.

Via forward and reverse links, a WCD such as WCD 110 may be communicatively coupled to a larger wireless communication network. As an illustrative example of a wireless communication network, BTS 112 may be communicatively coupled to an access node 120. Access node 120 may comprise, or otherwise be associated with, a base station controller (BSC), a radio network controller (RNC), and/or a similar type of device. Access node 120 may, in turn, be communicatively coupled to packet-switched networks 124, 126 via a packet data serving node (PDSN) 118. Alternatively or additionally, access node 120 may be communicatively coupled to PSTN 128 via a mobile switching center (MSC) 122. However, MSC 122 may be integrated with, or replaced by, an IP multimedia subsystem (IMS) infrastructure. Access node 120 may also communicate with PSTN 128 via a media gateway (not shown) that bridges Internet 124 or private IP network 126 to PSTN 128.

Although FIG. 1 shows only one BTS, network 100 may include more than one BTS. Each BTS may be communicatively coupled to access node 120 or to other network elements that are communicatively coupled to packet-switched networks 124, 126 and/or PSTN 128. Furthermore, WCD 110 may be able to transfer ongoing communication sessions from one BTS to another in a handoff process. Additionally, WCD 110 may also be handed off between two wireless coverage areas defined by the same BTS. Network 100 may also include multiple access nodes, PDSNs, and MSCs.

The combination of network elements including BTS 112, access node 120, PDSN 118, and MSC 122 may be collectively referred to as a RAN, and these elements are designated as components of RAN 130. However, RAN 130 may also be defined to comprise more or fewer elements. For example, RAN 130 may comprise multiple BTSs and/or access nodes.

Furthermore, these elements may be combined with one another; for example, some combination of a BTS, an access node, a PDSN, and an MSC may be physically co-located or may be logical components of the same physical element. Thus, it should be understood that any communications described herein as being between a WCD and a RAN may take place between a WCD and any component of a RAN. For example, these communications could take place between WCD 110 and access node 120, and/or between WCD 110 and BTS 112.

The component or components of RAN 130 preferably include at least one processor, data storage, and program instructions stored in the data storage and executable by the processor to carry out RAN functions described herein. Similarly, a WCD preferably includes at least one processor, data storage, and program instructions stored in the data storage and executable by the processor to carry out WCD functions. Furthermore, the WCDs and RAN 130 may operate and communicate with each other in accordance to various types of wireless protocols, such as Code Division Multiple Access (CDMA), Worldwide Interoperability for Microwave Access (WIMAX®), Universal Mobile Telecommunications System (UMTS), Long Term Evolution (LTE®), IEEE 802.11 (WIFI®), or other protocols now known or later developed.

Preferably, RAN 130 contains at least one forward link buffer and at least one reverse link buffer. The forward link buffer may queue packets that RAN 130 has received from endpoints in communication with WCDs served by RAN 130. RAN 130 preferably transmits the packets in the forward link buffer to these WCDs. The reverse link buffer may queue packets that RAN 130 has received from WCDs that it serves. RAN 130 preferably transmits the packets in the reverse link buffer to endpoints in communication with these WCDs. The forward link and reverse link buffers may be containing with various RAN components, such as, but not limited to, BTS 112, access node 120, PDSN 118, or some combination of these components.

Any given forward link buffer in a RAN may contain multiple physical or logical forward link buffers. Likewise, any given reverse link buffer in a RAN may contain multiple physical or logical reverse link buffers. For instance, RAN 130 may maintain separate logical forward link and reverse link buffers for each WCD that it serves. In this way, RAN 130 may be able to measure the occupancy of these buffers in order to detect patterns of bursty transmissions to each WCD.

II. Exemplary Causes of Bursty Traffic

The methods and devices presented herein may mitigate communication burstiness between a RAN and a WCD where a WCD's reverse link transmissions are gated by the forward link capacity allocated to the WCD by the RAN. In order to further appreciate these methods and devices, it is helpful to describe scenarios potentially prone to this burstiness. In a wireless communication network arranged similarly to network 100, there are at least two exemplary scenarios prone to such burstiness. The first exemplary scenario may occur when a WCD receives data from the RAN on a forward link, and then transmits a representation of that data on a reverse link. The second exemplary scenario may occur when a WCD is subject to "acknowledgement compression" in the forward direction.

Figure 2A:
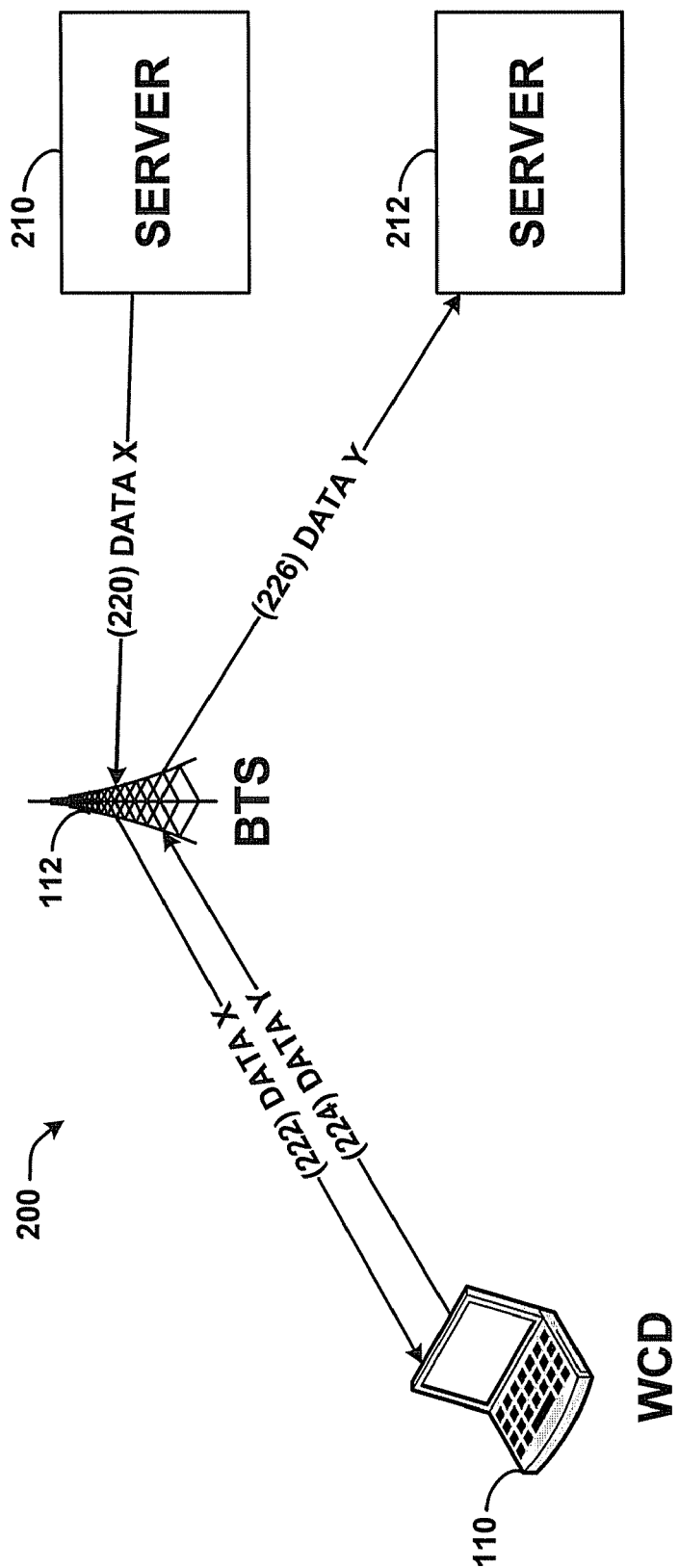
FIG. 2A depicts a scenario that could lead to congestion in a RAN.

FIG. 2A depicts system 200, an arrangement that may give rise to the first exemplary scenario. In system 200, WCD 110 is served by BTS 112. BTS 112 may be part of a larger RAN, such as RAN 130, but other RAN components are not shown for sake of simplicity. WCD 110 may be actively communicating with server 210 and server 212. Servers 210, 212 may be endpoints communicatively coupled to BTS 112 via a packet switched network, such as the Internet.

WCD 110 may be arranged to receive data from server 210, and then transmit a representation of at least some of this data to server 212. As depicted in FIG. 2A, at step 220 server 210 may transmit data X to BTS 112, and at step 222, BTS 112 may forward data X to WCD 110. Then, at step 224, WCD 110 may transmit data Y to BTS 112, and at step 226, BTS 112 may forward data Y to server 212. Preferably data Y is a representation of data X. For instance, data Y may be a complete copy of data X, a subset of data X, or some transformation of data X. Both data X and data Y may be transported in one or more packets.

System 200 may represent a system in which server 210 is arranged to transmit data X to WCD 110 continuously and in real time. For instance, server 210 may provide real-time stock quotes, and WCD 110 may have subscribed to this service for one or more stocks. Furthermore, server 212 may be a web site, or some other type of device, on which WCD 110 republishes at least some of the stock quotes, perhaps with additional information. This additional information might be a buy or sell recommendation for the stock, a moving average of each stock's price over a period of time, and so on. Of course, other transactions between server 210, WCD 110, and server 212 may fall within the scope of this embodiment. For instance, data Y may merely be sent in response to WCD 110 receiving data X, and data Y may not contain a copy of or a representation of data X.

In system 200, the WCD's reverse link transmissions may be gated, or limited, by the WCD's forward link capacity. For instance, if RAN allocates all of the forward link capacity to other WCDs for a period of time, WCD 110 may not receive any data (i.e., data X) during that period of time. Thus, WCD 110 will be unable to transmit any data (i.e., data Y) on the reverse link during that period of time. Then, the RAN may transmit both queued and incoming forward link data (e.g., data X) in a burst to WCD 110, and WCD 110 may respond by transmitting an associated burst of data (e.g., data Y) in the reverse direction.

Figure 2B:
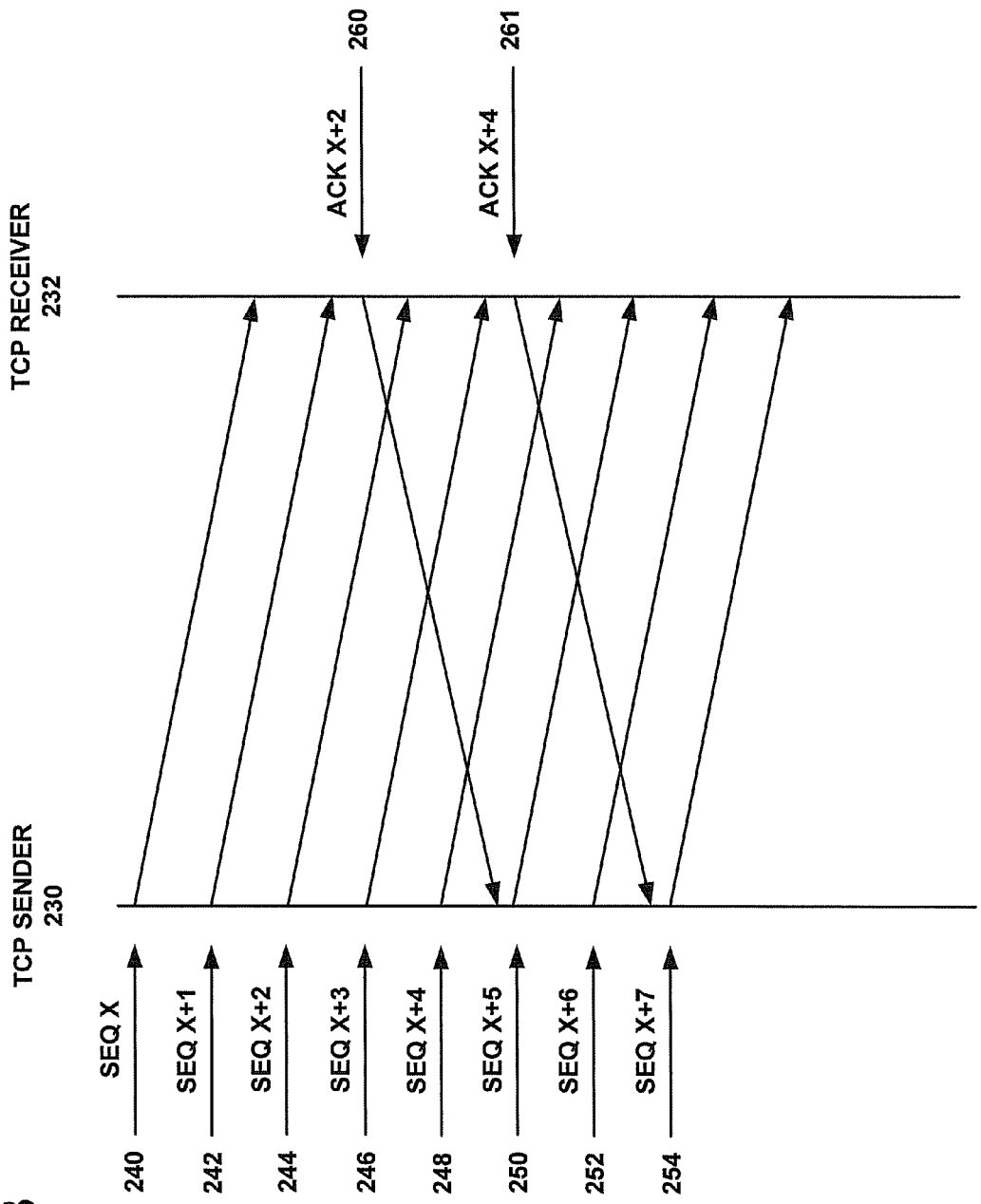
FIG. 2B depicts canonical TCP buffer occupancy behavior.
Figure 2C:
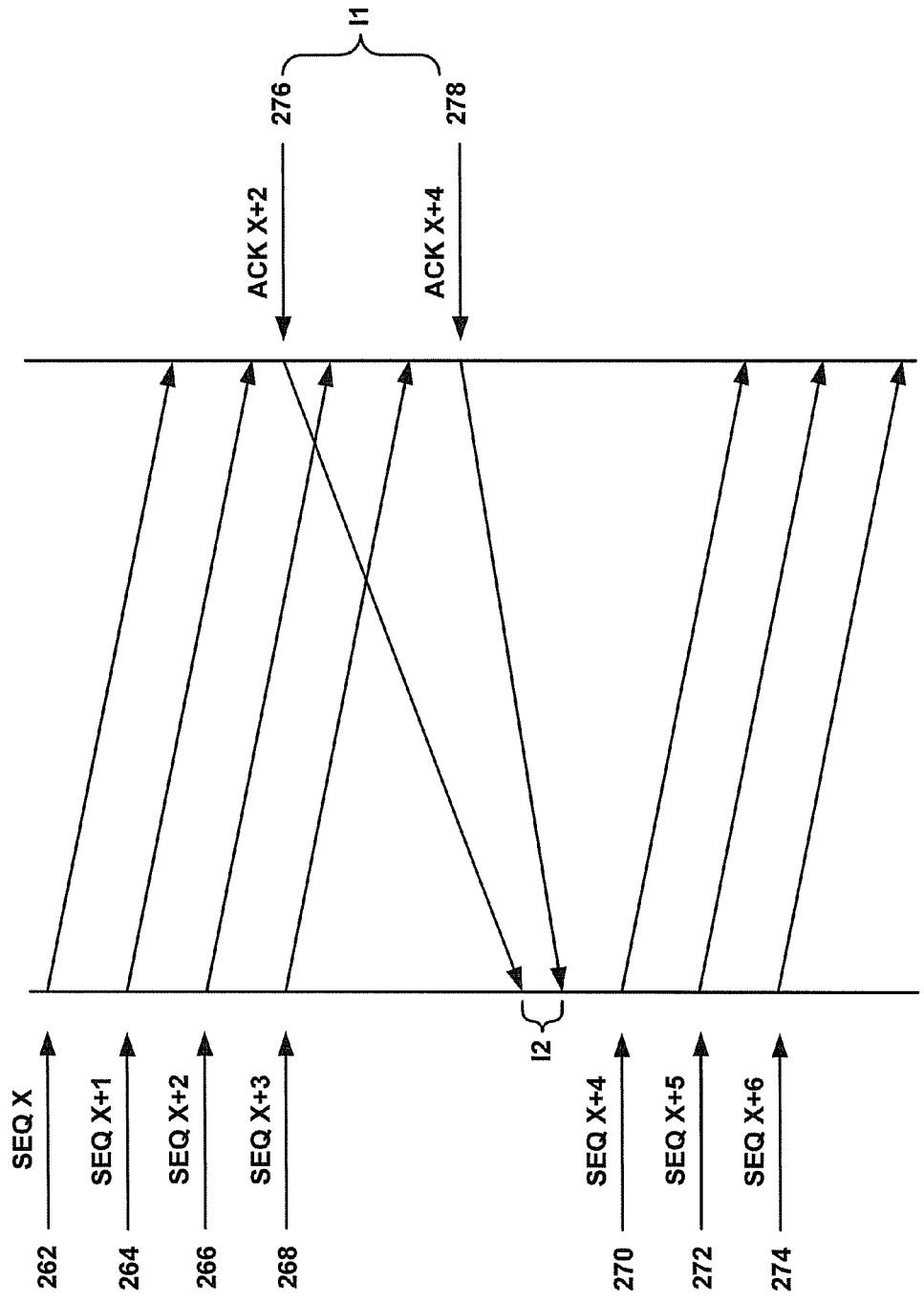
FIG. 2C depicts TCP buffer occupancy behavior that could lead to congestion in a RAN.

FIGS. 2B and 2C depict an arrangement that may give rise to a second exemplary cause of burstiness. In this arrangement, an application using the Internet's Transmission Control Protocol (TCP) can experience bursty transmissions. TCP may be used on the Internet and other IP networks for reliable delivery of data from one point to another. Many heavily-used protocols, including World Wide Web, email, file transfer, file sharing, and instant messaging protocols may make use of TCP.

The discussions of TCP herein may make reference to aspects of TCP that are defined in the Internet Engineering Task Force (IETF) Request For Comments (RFC) 2581, "TCP Congestion Control," which is hereby incorporated by reference in its entirety. Of course, TCP may exhibit behaviors and characteristics not explicitly discussed herein or in RFC 2581.

In order to provide reliable transport of data without overloading any intermediate hops between a source and a destination, TCP may utilize an adaptive sliding window protocol. Accordingly, a TCP sender (e.g., a WCD) may transmit a "window" of packets to a TCP receiver (e.g., an endpoint in communication with the TCP sender). Preferably such a window consists of one or more packets. Once the TCP sender has transmitted a window of packets, it may wait for TCP acknowledgements (ACKs) from the TCP receiver before transmitting more packets. Doing so may prevent the TCP sender from overloading the TCP receiver or intermediate nodes. Thus, the TCP sender's data rate may be gated by the rate at which the TCP sender receives TCP ACKs.

The TCP receiver preferably transmits a TCP ACK to the TCP sender for each two TCP packets that the TCP receiver receives. In this way, the TCP receiver may strive to keep the TCP sender's window open so that the TCP sender can transmit a relatively steady stream of TCP packets to the TCP receiver.

FIG. 2B depicts canonical TCP behavior between a TCP sender 230 and a TCP receiver 232. TCP sender 230 transmits a series of packets to TCP receiver 232, and TCP receiver 232 transmits an associated series of TCP acknowledgments to TCP sender 230. Each packet transmitted by TCP sender 230 preferably contains a sequence number, represented in FIG. 2B with the shorthand term "SEQ." Thus, at steps 240, 242, 244, 246, 248, 250, 252, and 254, TCP sender 230 transmits packets containing the sequence numbers X, X+1, X+2, X+3, X+4, X+5, X+6, and X+7, respectively.

The variable X used in FIG. 2B is in reference to the relative order of the packets transmitted by TCP sender 230. The starting value of X is arbitrary and may be chosen randomly, pseudo-randomly, or deterministically by TCP sender 230. Alternatively, a TCP implementation may represent sequence numbers as the number of bytes transmitted so far in the given TCP transaction. Thus, instead of the sequence numbers in FIG. 2B increasing sequentially with each packet that TCP sender 230 transmits, these sequence numbers could increase non-sequentially, by the number of bytes in each TCP packet. For sake of simplicity and presentation, the descriptions herein will represent TCP sequence numbers in terms of packets rather than bytes.

In addition to containing sequence numbers, TCP packets may also contain acknowledgement (ACK) numbers. Canonically, a TCP receiver, such as TCP receiver 232, may transmit a TCP ACK packet to TCP sender 230 at least once for every two packets that TCP receiver 232 receives. The value of the ACK number in a given TCP ACK packet may be the sequence number that TCP receiver 232 expects to find in the next TCP packet that it receives from TCP sender 230. Thus, after TCP receiver 232 receives a TCP packet with a sequence number of X+1, TCP receiver 232 may transmit a TCP ACK packet 260 with an ACK number of X+2. Similarly, after TCP receiver 232 receives a TCP packet with a sequence number of X+3, TCP receiver 232 may transmit a TCP ACK packet 261 with an ACK number of X+4. For purposes of illustration, any further TCP ACK packets that may be transmitted by TCP receiver 232 are omitted.

One aspect of the TCP behavior illustrated in FIG. 2B is that TCP sender 230 receives frequent acknowledgements. This preferably allows TCP sender 230 to maintain an open sliding window, so that TCP sender 230 can transmit TCP packets at a relatively steady stream. However, if TCP sender 230 does not receive acknowledgement in a timely fashion, the transmissions of TCP sender 230 may be reduced, or they may occur in a different pattern.

FIG. 2C depicts such an occurrence. In this illustration, WCD 110 is a TCP sender. At steps 262, 264, 266, 268, 270, 272, and 274, WCD 110 transmits a series of TCP packets with the sequence numbers X, X+1, X+2, X+3, X+4, X+5, and X+6, respectively. Unlike the depiction of FIG. 2B, in FIG. 2C the TCP ACK packets received by WCD 110 are "compressed," meaning that they arrive close to one another in time.

After receiving TCP packet X+1, server 252 transmits ACK packet X+2 at step 276. Then, after receiving TCP packet X+3, server 252 transmits TCP ACK packet X+4 at step 278. Despite there being a time interval of I1 between the transmissions of the two TCP ACK packets, there may be a shorter time interval of I2 between the reception of these two packets by WCD 110. Thus, TCP ACK packet X+2 (and possibly TCP ACK packet X+4) were delayed between server 252 and WCD 110. In particular, these ACK packets were delayed such that the interval of time between them shrank. This phenomenon may be referred to as "ACK compression," and can be caused by a number of factors. For instance, ACK compression in the scenario depicted in FIG. 2C could be caused by forward link congestion at a RAN serving WCD 110. The RAN might receive TCP ACK packet X+2 and TCP ACK packet X+4 at an interval of I1, but hold these packets in a buffer until the RAN allocates forward link capacity (e.g., slots) to WCD 110. Then, the RAN may transmit the TCP ACK packets to WCD 110 with a shorter interval of I2 between the respective TCP ACK packet transmissions.

The result of ACK compression may be bursty traffic in both the forward and reverse directions. As depicted in FIG. 2C, WCD 110 transmits a burst of TCP packets to server 252 at steps 262, 264, 266, and 268. Then, presumably because its sliding window is closed, WCD 110 waits for one or more TCP ACK packets from server 252. Once WCD 110 receives TCP ACK packet X+2 and TCP ACK packet X+4, WCD 110 transmits another burst of TCP packets, at steps 270, 272, and 274. Thus, FIG. 2C illustrates how forward link congestion can result in bursty traffic on both the forward link and the reverse link of a WCD.

It is relatively well understood that as the burstiness of network traffic increases, so does the buffer capacity required to queue this traffic without dropping any of it. In other words, for a given data rate, increasing the burstiness of the packet arrival rate results in longer queues and potentially more packet loss at intermediate nodes.

III. Detecting and Smoothing Bursty Traffic

Given the potentially deleterious impact that bursty traffic can have on communication networks (e.g., packet delay and/or packet loss), it would be advantageous to be able to smooth occurrences of bursty traffic as they happen. If a pattern of bursty traffic can be detected by a RAN component, such as an access node or a BTS, then the RAN component may be able to take steps to smooth this burstiness.

Figure 3:
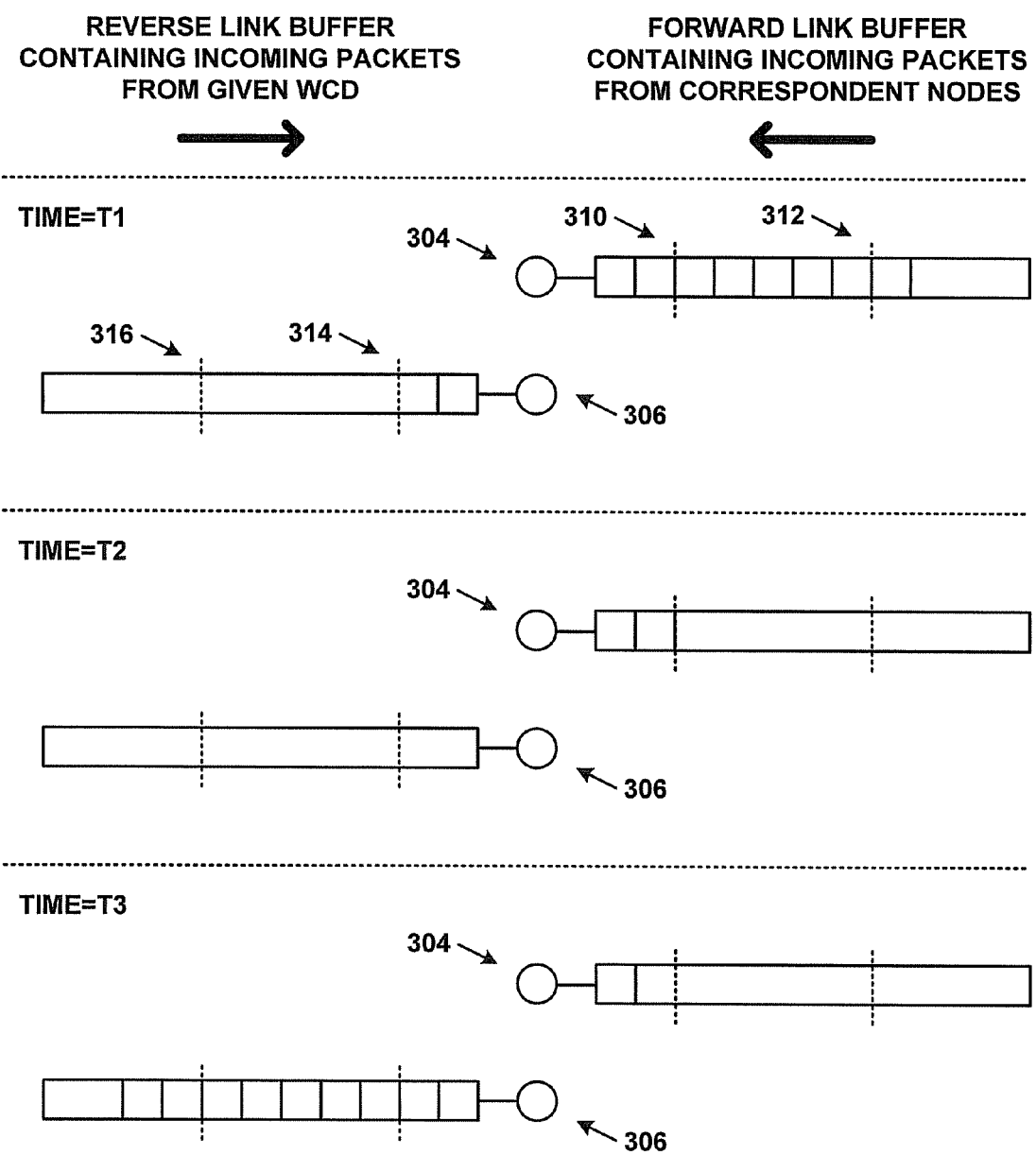
FIG. 3 depicts how a RAN could detect buffer occupancy that may be indicative of congestion, in accordance with an exemplary embodiment.

FIG. 3 illustrates how a RAN component may be able to detect bursty traffic for a given WCD by observing the forward and reverse link buffer occupancy for that given WCD. FIG. 3 depicts forward link buffer 304 and reverse link buffer 306 at the RAN component. Forward link buffer 304 may contain incoming packets, headed to the given WCD, that may have been transmitted by one or more endpoints in communication with the WCD. Reverse link buffer 306 may contain incoming packets, from the given WCD, that may be headed to one or more endpoints in communication with the WCD. FIG. 3 illustrates these buffers at three points in time, T1, T2, and T3.

It should be understood that forward link buffer 304 and reverse link buffer 306 may be separate physical or logical buffers associated with the given WCD. Additionally, the RAN component may also comprise other physical or logical buffers that queue packets for other WCDs.

Both forward link buffer 304 and reverse link buffer 306 may be associated with a high threshold and a low threshold. Thus, forward link buffer 304 may be associated with low threshold 310 and high threshold 312, while reverse link buffer 306 may be associated with low threshold 314 and high threshold 316. These thresholds may be used by the RAN component to detect patterns of bursty traffic.

In this regard, FIG. 3 illustrates a pattern of buffer occupancy that may be indicative of bursty traffic. At time T1, forward link buffer 304 contains 8 packets, which is one more than high threshold 312. However, also at time T1, reverse link buffer 306 contains only one packet, which is one less than low threshold 314. Thus, the RAN component may be queueing a burst of forward direction traffic for the given WCD, but also queueing a relatively negligible amount of reverse direction traffic for the given WCD. The pattern observed at time T1 may be indicative of forward link congestion in the RAN component.

At time T2, which occurs after time T1, forward link buffer 304 contains 2 packets, which is less than low threshold 310. But, also at time T2, reverse link buffer 306 contains no packets, and thus is obviously below low threshold 314. Thus, at time T2, the RAN component may have transmitted most or all of the packets queued in the forward link and reverse link buffers at time T1.

Then, at time T3, forward link buffer 304 contains 1 packet, which is below low threshold 310. Also at time T3, reverse link buffer 306 contains 9 packets, and thus is above high threshold 316. Therefore, at time T3, the RAN component may be queueing a burst of reverse direction traffic from the given WCD, but may also be queueing a relatively negligible amount of forward direction traffic headed to the given WCD.

Considering the observations taking place at times T1, T2, and T3, the pattern of buffer occupancies illustrated in Figure T3 may be indicative of bursty traffic caused by forward link congestion. For instance, at time T1, the RAN may be queueing a large number of packets for the given WCD because the forward link to the given WCD is congested. Thus, the forward link may be shared, via TDM or some other technique, with several other WCDs. The RAN component may have allocated capacity to those other WCDs rather then the given WCD. At time T2, however, the forward link buffer is nearly empty, indicating that the RAN component may have eventually allocated sufficient forward link capacity to the given WCD for the queued packets to be transmitted. Then, at time T3, the RAN component may be queueing a large number of packets from the given WCD, since the reverse link buffer is heavily occupied. Thus, the given WCD may have been waiting for the forward link packets queued at time T1, and in response to receiving these packets, transmitted a burst of packets on the reverse link prior to time T3.

It should be understood that a RAN component could use other patterns of buffer occupancy to detect forward link congestion. For instance, a pattern of buffer occupancy that is indicative of forward link congestion may exclude the observation at time T2, where both the forward link and reverse link buffers are sparsely occupied. In general, the illustrations in FIG. 3 are for purposes of example and not intended to be limiting. Thus, forward link buffer 304 and reverse link buffer 306 may be smaller or larger, may be capable of queueing more or fewer packets, and the buffers' associated high and low thresholds may take on different values.

Once a RAN component has detected at least one pattern of buffer occupancy that is (i) indicative of forward link congestion, and (ii) potentially impacting the reverse link transmissions of a given WCD, the RAN component may take steps to mitigate the forward link congestion. For instance, the RAN component may, for a period of time, allocate additional forward link capacity to the given WCD. In doing so, the RAN component may smooth the pattern of traffic to and from the given WCD, thus potentially reducing the forward link congestion as well.

Figure 4:
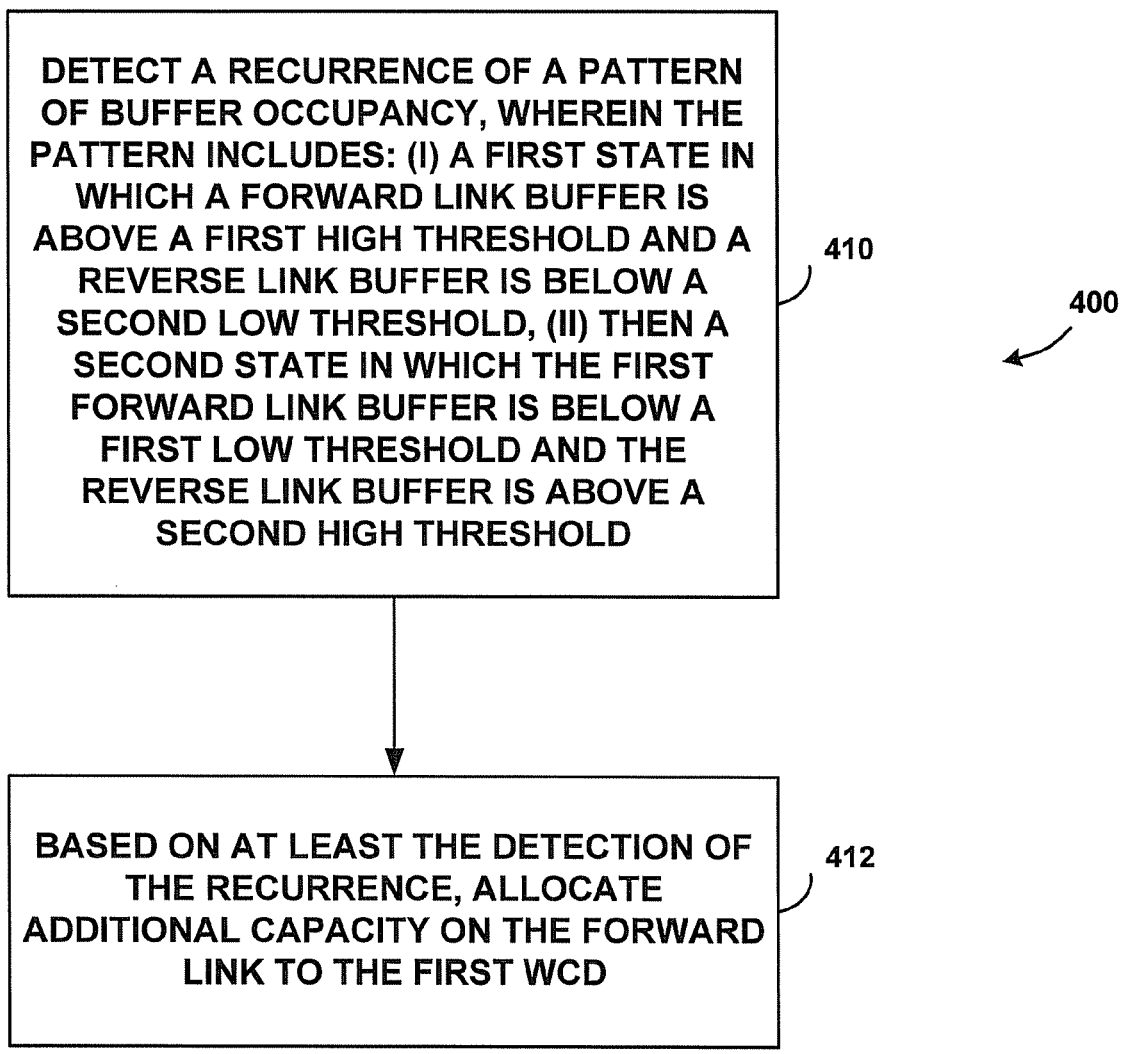
FIG. 4 is a flow chart, in accordance with an exemplary embodiment.

Accordingly, FIG. 4 is a flow chart of method 400 for improving the performance of a RAN. Preferably, the RAN radiates to define a wireless coverage area, and the wireless coverage area comprises a forward link and a reverse link. The wireless coverage area may serve a first WCD, and in this regard the RAN may contain a forward link buffer that queues packets headed to the first WCD, and a reverse link buffer that queues packets from the first WCD. The forward link buffer may be associated with a first high threshold and a first low threshold, and the reverse link buffer may be associated with a second high threshold and a second low threshold. In some cases, but not necessarily, the first WCD may be engaged in (i) primarily transmitting data in the reverse direction, or (ii) receiving data in the forward direction, then transmitting a representation of at least some of that data in the reverse direction.

At step 410, the RAN component may detect a recurrence of a pattern of buffer occupancy. This pattern may include a first state, in which the forward link buffer is above the first high threshold and the reverse link buffer is below the second low threshold, followed by a second state, in which the forward link buffer is below the first low threshold and the reverse link buffer is above the second high threshold. Preferably the pattern occurs within a given duration of time.

At step 412, based on at least the detection of the recurrence, the RAN may allocate additional capacity on the forward link to the first WCD. This additional capacity may take various forms. For instance, the forward link may operate according to TDM. Thus, the forward link may be divided into TDM slots such that the RAN may be capable of transmitting data to at least one WCD during each forward link slot. In such a situation, the RAN may allocate additional capacity on the forward link to the first WCD by allocating at least one forward link slot to the first WCD instead of allocating the at least one forward link slot to a second WCD.

Alternatively or additionally, the RAN may allocate capacity on the forward link to the first WCD instead of to a second WCD by determining that the forward link buffer contains a first data to transmit to the first WCD, and determining that a second forward link buffer contains a second data to transmit to the second WCD. Then, the RAN may transmit the first data to the first WCD during a first forward link slot, and transmit the second data to the second WCD during a second forward link slot. Preferably, the first forward link slot occurs before the second forward link slot.

In such cases where the RAN allocates additional capacity on the forward link to a first WCD rather than to a second WCD, the RAN may do so without changing any forward link quality of service that was previously assigned to the first WCD. Such a forward link quality of service may be one or more of a level of priority associated with the first WCD, or associated with some or all of the first WCD's traffic. The level of priority may apply to some or all of a bit rate, a packet rate, a packet loss rate, a packet delay, a packet jitter, or some other metric of communication quality.

Thus, for example, before the RAN detects the pattern of buffer occupancy, the RAN may assign both the first WCD and the second WCD a given level of forward link quality of service. Then, the RAN may allocate additional capacity to the first WCD while maintaining the same forward link quality of service for the first WCD and the second WCD. Thus, the RAN may allocate additional forward direction TDM slots to the first WCD, despite the first WCD and the second WCD having the same forward direction quality of service. Doing so may provide a temporary boost to the first WCD's forward link capacity, so that the first WCD's data flows in both the forward direction and the reverse direction are smoothed.

Figure 5:
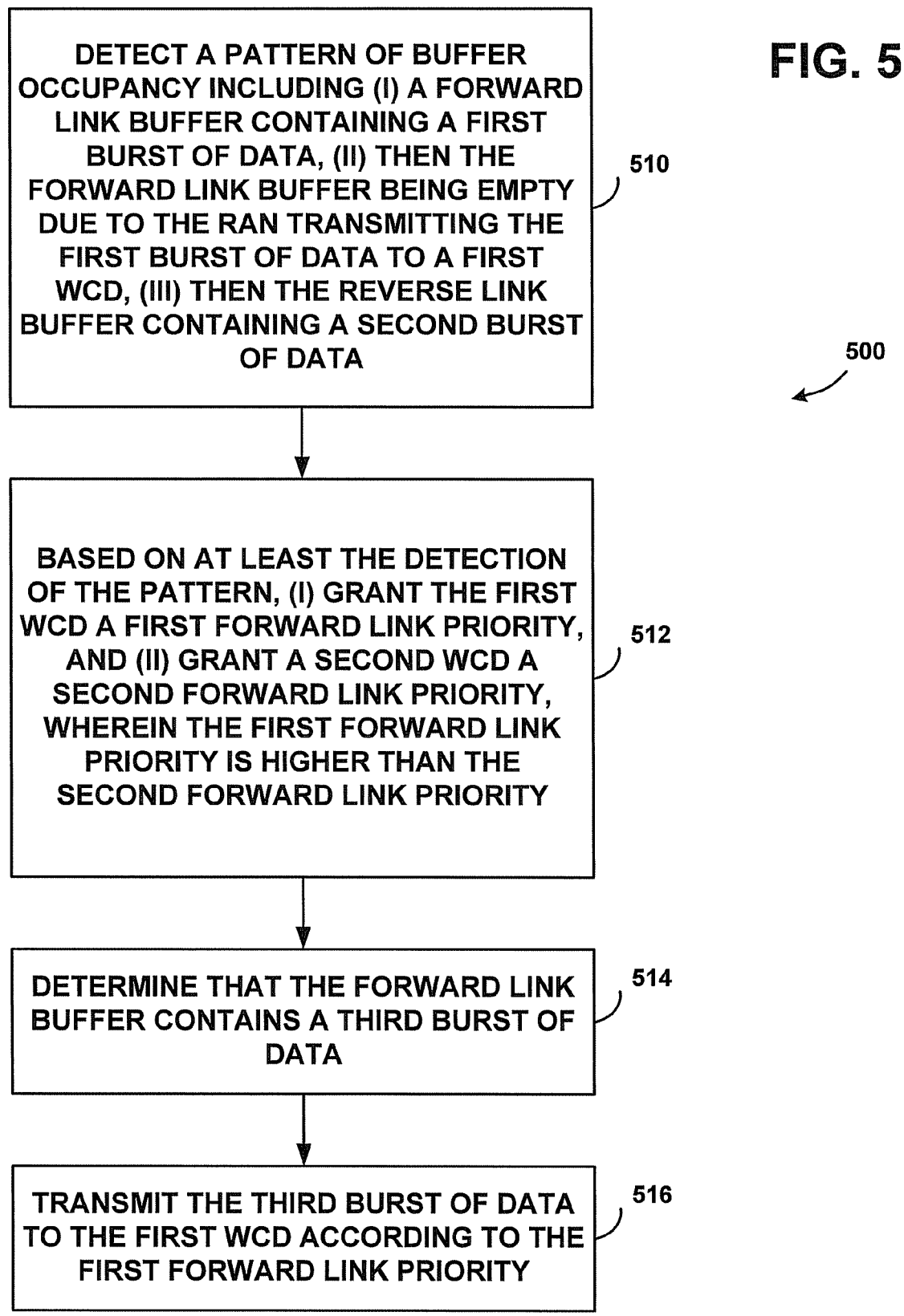
FIG. 5 is another flow chart in accordance with an exemplary embodiment.

FIG. 5 is another flow chart representing method 500, also for improving the performance of a RAN. Similar to method 400, the RAN may radiate to define a wireless coverage area, and the wireless coverage area may comprise a forward link and a reverse link. Via the wireless coverage area, the RAN may serve a first WCD and a second WCD. The RAN may contain a forward link buffer associated with the first WCD and a reverse link buffer, also associated with the first WCD.

At step 510, the RAN may detect a pattern of buffer occupancy including (i) the forward link buffer containing a first burst of data, (ii) then the forward link buffer being empty due to the RAN transmitting the first burst of data to the WCD, (iii) then the reverse link buffer containing a second burst of data. This pattern of buffer occupancy may occur within a given period of time. At step 512, based on at least the detection of the pattern, the RAN may (i) grant the first WCD a first forward link priority, and (ii) grant the second WCD a second forward link priority. Preferably, the first forward link priority is higher than the second forward link priority. The first and second forward link priorities may apply to some or all of a bit rate, a packet rate, a packet loss rate, a packet delay, a packet jitter, or some other metric of communication quality.

At step 514, the RAN may determine that the forward link buffer contains a third burst of data, and at step 516, the RAN may transmit the third burst of data to the first WCD according to the first forward link priority.

In both methods 400 and 500, the RAN may maintain a forward link data rate threshold for a WCD. This forward link data rate threshold preferably represents a maximum forward link data rate at which the WCD can receive forward link data. In addition to the ways of detecting patterns of buffer occupancy described in methods 400 and 500, the RAN may also determine that the WCD is receiving forward link data at a rate below a forward link data rate threshold associated with the WCD. Such a determination may be indicative of forward link congestion in the RAN. In response to this determination, the WCD may allocate additional capacity on the forward link to the WCD In some wireless communication technologies, such as CDMA, the RAN may maintain a maximum forward link data rate for each WCD. For example, a CDMA RAN may maintain a data rate control (DRC) value for each WCD it serves. Preferably, a DRC value is determined from a request that the RAN receives from a respective WCD, and may be based on observed forward link quality at the respective WCD. Exemplary DRC values are shown in Table 1.

TABLE 1

Exemplary DRC values and associated data rates.

| DRC Value | Forward direction data rate (kilobits per second) |
|---|---|
| 1 | 38.4 |
| 2 | 76.8 |
| 3 | 153.6 |
| 4/5 | 307.2 |
| 6/7 | 614.4 |
| 8 | 921.6 |
| 9/10 | 1228.8 |
| 11 | 1843.2 |
| 12 | 2457.6 |
| 13 | 1536 |
| 14 | 3072 |

The WCD may transmit a DRC value to the RAN periodically, according to a static or dynamic schedule, randomly, or in response to a trigger that is internal or external to the WCD. Upon receiving a DRC value from a WCD, the RAN may select the data rate associated with the DRC value. Alternatively, the RAN may select a higher or lower data rate based on RAN configuration or policy. Also, the DRC value associated with a DRC may specify a target data rate rather than a maximum data rate.

The RAN may determine that the WCD is receiving forward link data at a rate significantly below that of the WCD's assigned DRC value. The RAN may use such a determination as another indication that the WCD is suffering from forward link congestion, and accordingly the RAN may allocate additional forward link capacity to the WCD.

It should be understood that the methods, processes, and transactions presented in FIGS. 4 and 5 may occur in a different order, and fewer or more steps or events may occur without departing from the scope of the embodiments. Moreover, the methods, processes, and transactions depicted in these figures may be combined with one another wholly or in part, to form additional embodiments that are also within the scope of this invention.

IV. Exemplary RAN Component

Figure 6:
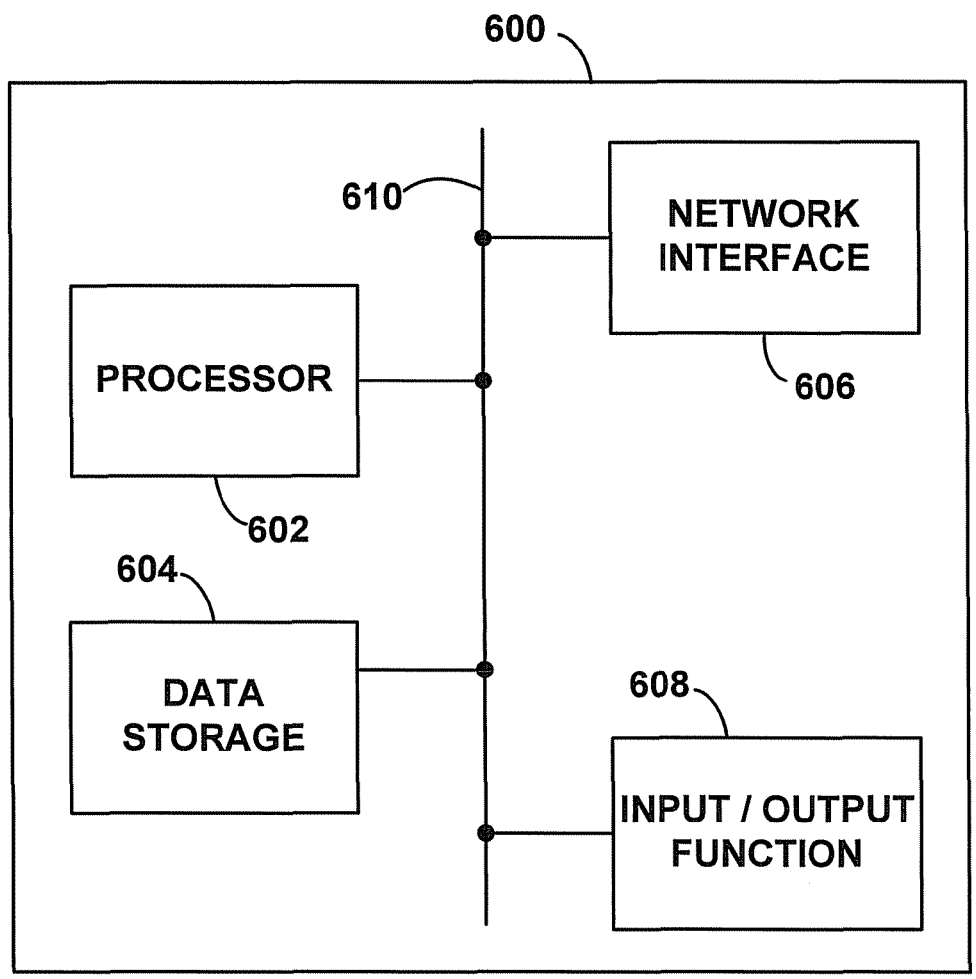
FIG. 6 depicts a radio access network component, in accordance with an exemplary embodiment.

FIG. 6 is a simplified block diagram depicting an exemplary representation of RAN component 600, such as but not limited to a BTS or an access node. FIG. 6 illustrates some of the functional components that would likely be found in an RAN component 600 arranged to operate in accordance with the embodiments herein. RAN component 600 preferably includes a processor 602, a data storage 604, a network interface 606, and an input/output function 608, all of which may be coupled by a system bus 610 or a similar mechanism.

Processor 602 preferably includes one or more CPUs, such as one or more general purpose processors and/or one or more dedicated processors (e.g., application specific integrated circuits (ASICs) or digital signal processors (DSPs), etc.) Data storage 604, in turn, may comprise volatile and/or non-volatile memory and can be integrated in whole or in part with processor 602. Data storage 604 preferably holds program instructions executable by processor 602, and data that is manipulated by these instructions, to carry out various functions described herein. Alternatively, the functions can be defined by hardware, firmware, and/or any combination of hardware, firmware and software.

Network interface 606 may take the form of a wireline connection, such as an Ethernet, Token Ring, SONET, or T-carrier connection. Network interface 606 may alternatively or additionally take the form of a wireless connection, such as IEEE 802.11, BLUETOOTH®, CDMA, WIMAX®, UMTS®, LTE®, or any other interface used to communicate with client nodes. However, other forms of physical layer connections and other types of standard or proprietary communication protocols may be used over network interface 606. Furthermore, network interface 606 may comprise multiple physical or logical network interfaces, each capable of operating according to the same or different protocols.

Input/output function 608 facilitates user interaction with RAN component 600. Input/output function 608 may comprise multiple types of input devices, such as a keyboard, a mouse, a touch screen, and so on. Similarly, input/output function 608 may comprise multiple types of output devices, such as a monitor, printer, or one or more light emitting diodes (LEDs). Additionally or alternatively, RAN component may support remote access from another device, via network interface 606 or via another interface (not shown), such an RS-232 port.

By way of example, the data in data storage 604 may contain information associated with performing any of the methods, processes, or functions described herein or represented by any of the accompanying figures. For example, data storage 604 may contain forward link and reverse link buffers, and representations of high and/or low thresholds associated with these buffers. Data storage 604 may also contain program instructions that are executable by processor 602 to perform any of the methods, processes, or functions presented herein or represented by any of the accompanying figures.

VI. Conclusion

Exemplary embodiments have been described above. Those skilled in the art will understand, however, that changes and modifications may be made to these embodiments without departing from the true scope and spirit of the invention, which is defined by the claims.

What is claimed is:

1. A method for improving the performance of a radio access network (RAN), wherein the RAN radiates to define a wireless coverage area, wherein the wireless coverage area comprises a forward link and a reverse link, wherein the wireless coverage area serves a first wireless communication device (WCD), and wherein the RAN contains a forward link buffer that queues packets to the first WCD, and a reverse link buffer that queues packets from the first WCD, wherein the forward link buffer is also associated with a first high threshold and a first low threshold, and wherein the reverse link buffer is also associated with a second high threshold and a second low threshold, the method comprising:

the RAN detecting a recurrence of a pattern of buffer occupancy, wherein the pattern includes: (i) a first state in which the forward link buffer is above the first high threshold and the reverse link buffer is below the second low threshold, (ii) then a second state in which the forward link buffer is below the first low threshold and the reverse link buffer is above the second high threshold, wherein the pattern occurs within a given duration of time; and based on at least the detection of the recurrence, the RAN allocating additional capacity on the forward link to the first WCD.

2. The method of claim 1, wherein the pattern includes a third state in which the first forward link buffer is below the first low threshold and the reverse link buffer is below the second low threshold, wherein the third state occurs between when the first state occurs and when the second state occurs.

3. The method of claim 1, wherein the forward link operates according to time division multiplexing (TDM), whereby the forward link is divided into TDM slots, wherein the RAN is configured to transmit data to at least one WCD during each forward link slot.

4. The method of claim 3, wherein the wireless coverage area also serves a second WCD, wherein the RAN allocating the additional capacity on the forward link to the first WCD comprises:

the RAN allocating at least one forward link slot to the first WCD instead of allocating the at least one forward link slot to the second WCD.

5. The method of claim 3, wherein the wireless coverage area also serves a second WCD, wherein the RAN also contains a second forward link buffer associated with a second WCD, and wherein the RAN allocating the additional capacity on the forward link to the first WCD instead of to the second WCD comprises: the RAN determining that the forward link buffer contains a first data to transmit to the first WCD; the RAN determining that the second forward link buffer contains a second data to transmit to the second WCD; the RAN transmitting the first data to the first WCD during a first forward link slot; and the RAN transmitting the second data to the second WCD during a second forward link slot, wherein the first forward link slot occurs before the second forward link slot.

6. The method of claim 1, wherein the first WCD is engaging in at least one of (i) primarily transmitting data in a reverse direction, and (ii) receiving data in a forward direction, then transmitting a representation of at least some of that data in the reverse direction.

7. The method of claim 1, wherein the wireless coverage area also serves a second WCD, the method further comprising:

before the RAN detects the recurrence of the pattern, the RAN assigning both the first WCD and the second WCD a given level of forward link quality of service.

8. The method of claim 1, wherein the RAN maintains a forward link data rate threshold associated with the WCD, the method further comprising:

the RAN determining that the first WCD is receiving forward link data at a rate below the forward link data rate threshold associated with the first WCD, wherein the RAN allocating the additional capacity on the forward link to the first WCD is also based on the determination.

9. A radio access network (RAN), comprising: a base transceiver station that radiates to define a wireless coverage area, wherein the wireless coverage area comprises a forward link and a reverse link, wherein the wireless coverage area serves a first wireless communication device (WCD); a processor configured to execute program instructions; and a memory configured to store (i) program data, and (ii) program instructions executable by the processor, wherein the program data includes a forward link buffer associated with the first WCD, and a reverse link buffer associated with the first WCD, and wherein the program instructions are executable by the processor to (i) detect a recurrence of a pattern of buffer occupancy, wherein the pattern includes: (a) a first state in which the forward link buffer is above a first high threshold and the reverse link buffer is below a second low threshold, (b) then a second state in which the forward link buffer is below a first low threshold and the reverse link buffer is above a second high threshold, wherein the pattern occurs within a given duration of time, and (ii) based on at least the detection of the recurrence, allocate additional capacity on the forward link to the first WCD.

10. The RAN of claim 9, wherein the forward link operates according to time division multiplexing (TDM), whereby the forward link is divided into TDM slots, wherein the RAN is configured to transmit data to at least one WCD during each forward link slot, and wherein the program instructions, executable by the processor, to allocate the additional capacity on the forward link to the first WCD comprises program instructions, executable by the processor, to allocate at least one forward link slot to the first WCD.

11. The RAN of claim 9, wherein the program data also includes a forward link data rate threshold associated with the WCD, wherein the program instructions are executable by the processor also to determine that the first WCD is receiving forward link data at a rate below the forward link data rate threshold associated with the first WCD, wherein the RAN allocating the additional capacity on the forward link to the first WCD is also based on the determination.

12. The RAN of claim 9, wherein the first burst of data and the second burst of data are both associated with an application executing on the first WCD.

13. The RAN of claim 9, wherein the RAN also serves a second WCD, wherein the program instructions executable by the processor to allocate the additional capacity on the forward link to the first WCD comprise:

program instructions executable by the processor to allocate at least one forward link slot to the first WCD instead of allocating the at least one forward link slot to the second WCD.

* * * * *